(12) United States Patent
Yamamori et al.

(10) Patent No.: US 10,043,267 B2
(45) Date of Patent: Aug. 7, 2018

(54) MEDICAL IMAGE PROCESSING APPARATUS AND MEDICAL IMAGE PROCESSING METHOD

(71) Applicant: Toshiba Medical Systems Corporation, Otawara-shi (JP)

(72) Inventors: Kyohei Yamamori, Otawara (JP); Satoshi Wakai, Nasushiobara (JP); Masahiro Ozaki, Otawara (JP)

(73) Assignee: Toshiba Medical Systems Corporation, Otawara-shi (JP)

( * ) Notice: Subject to any disclaimer, the term of this patent is extended or adjusted under 35 U.S.C. 154(b) by 190 days.

(21) Appl. No.: 14/728,049

(22) Filed: Jun. 2, 2015

(65) Prior Publication Data

US 2015/0348263 A1 Dec. 3, 2015

(30) Foreign Application Priority Data

Jun. 2, 2014 (JP) ................................. 2014-114057

(51) Int. Cl.
*G06T 7/00* (2017.01)
(52) U.S. Cl.
CPC .. *G06T 7/0012* (2013.01); *G06T 2207/10081* (2013.01); *G06T 2207/30048* (2013.01); *G06T 2207/30101* (2013.01)
(58) Field of Classification Search
CPC ......... G06T 7/0012; G06T 2207/10081; G06T 2207/30048; G06T 2207/30101
See application file for complete search history.

(56) References Cited

U.S. PATENT DOCUMENTS

| | | | |
|---|---|---|---|
| 8,594,413 B2* | 11/2013 | Yamagata | A61B 6/461 382/134 |
| 9,008,386 B2* | 4/2015 | Verstraeten | G06F 19/3437 128/922 |
| 9,195,800 B2* | 11/2015 | Grady | G06F 19/3437 |
| 9,317,919 B2* | 4/2016 | Waechter-Stehle | G06T 7/0014 |
| 9,445,777 B2* | 9/2016 | Kitamura | A61B 6/032 |
| 2002/0182260 A1* | 12/2002 | Mak | A61K 36/00 424/522 |

(Continued)

FOREIGN PATENT DOCUMENTS

| | | |
|---|---|---|
| JP | 2010088795 A | 4/2010 |
| JP | 2011-239889 | 12/2011 |
| JP | 2012085721 A | 5/2012 |

OTHER PUBLICATIONS

Waechter, R. "Patient Specific Models for Planning and Guidance of Minimally Invasive Aortic Valve Implantation" MICCAI, 2010, Part 1, LNCS 6361, pp. 1-8 (526-533).*

(Continued)

*Primary Examiner* — Mia M Thomas
(74) *Attorney, Agent, or Firm* — Oblon, McClelland, Maier & Neustadt, L.L.P.

(57) ABSTRACT

A method and apparatus is provided for medical image processing. The processing of the medical image extracting a living valve image by analyzing a 3D image of an anatomical organ of a subject, specifying a distribution of an amount of calcium in the living valve image from CT pixel values in the living valve image, and specifying a distribution of difficulty levels of implanting an artificial valve to the anatomical organ based on a comparison between the amount of calcium and a predetermined value.

18 Claims, 13 Drawing Sheets

(56) References Cited

U.S. PATENT DOCUMENTS

| | | | |
|---|---|---|---|
| 2004/0116951 A1* | 6/2004 | Rosengart | A61B 17/320725 606/167 |
| 2004/0122320 A1* | 6/2004 | Murashita | A61B 8/0858 600/449 |
| 2004/0210304 A1* | 10/2004 | Seguin | A61F 2/2409 623/2.11 |
| 2005/0171472 A1* | 8/2005 | Lutter | A61B 17/00234 604/101.03 |
| 2005/0203549 A1* | 9/2005 | Realyvasquez | A61B 17/11 606/142 |
| 2008/0085043 A1* | 4/2008 | Watanabe | A61B 8/08 382/131 |
| 2008/0095421 A1* | 4/2008 | Sun | A61B 6/12 382/131 |
| 2009/0016483 A1* | 1/2009 | Kawasaki | A61B 5/02007 378/4 |
| 2009/0123050 A1* | 5/2009 | Ionasec | G06K 9/00 382/131 |
| 2009/0136106 A1* | 5/2009 | Roberts | G06T 15/08 382/130 |
| 2009/0304245 A1* | 12/2009 | Egger | G06T 7/187 382/128 |
| 2010/0092053 A1* | 4/2010 | Manabe | G06K 9/4638 382/128 |
| 2010/0185091 A1* | 7/2010 | Sumi | A61B 8/08 600/443 |
| 2010/0278405 A1* | 11/2010 | Kakadiaris | G06F 19/3431 382/131 |
| 2010/0280352 A1* | 11/2010 | Ionasec | A61B 5/0263 600/407 |
| 2011/0096969 A1* | 4/2011 | Zheng | G06K 9/00214 382/131 |
| 2011/0153286 A1* | 6/2011 | Zaeuner | G06F 19/3437 703/1 |
| 2011/0222750 A1* | 9/2011 | Liao | G06T 7/149 382/131 |
| 2011/0235878 A1* | 9/2011 | Nakayama | A61B 6/481 382/128 |
| 2011/0255755 A1* | 10/2011 | Shirahata | G06T 19/00 382/128 |
| 2012/0022843 A1* | 1/2012 | Ionasec | G06T 13/20 703/9 |
| 2012/0075638 A1* | 3/2012 | Rollins | A61B 1/00009 356/479 |
| 2012/0232386 A1* | 9/2012 | Mansi | A61B 8/0883 600/437 |
| 2012/0280980 A1* | 11/2012 | Neubauer | A61B 6/12 345/419 |
| 2012/0310074 A1* | 12/2012 | Yamamori | A61B 6/503 600/407 |
| 2013/0108141 A1* | 5/2013 | Yamagata | A61B 6/461 382/134 |
| 2013/0155064 A1* | 6/2013 | Grbic | A61B 5/055 345/420 |
| 2013/0211531 A1* | 8/2013 | Steines | A61F 2/4684 623/20.35 |
| 2013/0237827 A1* | 9/2013 | Yamamori | A61B 8/5207 600/450 |
| 2014/0177935 A1* | 6/2014 | Nair | A61B 8/06 382/132 |
| 2014/0270427 A1* | 9/2014 | Fonte | G06T 7/0012 382/128 |
| 2015/0051885 A1* | 2/2015 | Grady | G06T 7/0012 703/2 |
| 2015/0199478 A1* | 7/2015 | Bhatia | A61B 6/488 382/128 |
| 2015/0213629 A1* | 7/2015 | Celi | A61B 5/0066 382/128 |
| 2015/0248593 A1* | 9/2015 | Nakashima | A61B 6/505 382/131 |
| 2016/0051822 A1* | 2/2016 | Guez | A61N 1/36114 607/122 |
| 2016/0128786 A1* | 5/2016 | Weber | G06T 7/251 382/128 |
| 2017/0046839 A1* | 2/2017 | Paik | G06T 7/0014 |

OTHER PUBLICATIONS

Sun, Z. "Multislice CT angiography in coronary artery disease: Technical developments, radiation dose and diagnostic value" World Journal of Cardiology (Oct. 26, 2010) 2(10) pp. 333-343.*

Japanese Office Action dated Mar. 14, 2018 in Japanese Application No. 2014-114057 with English translation, 6 pages.

* cited by examiner

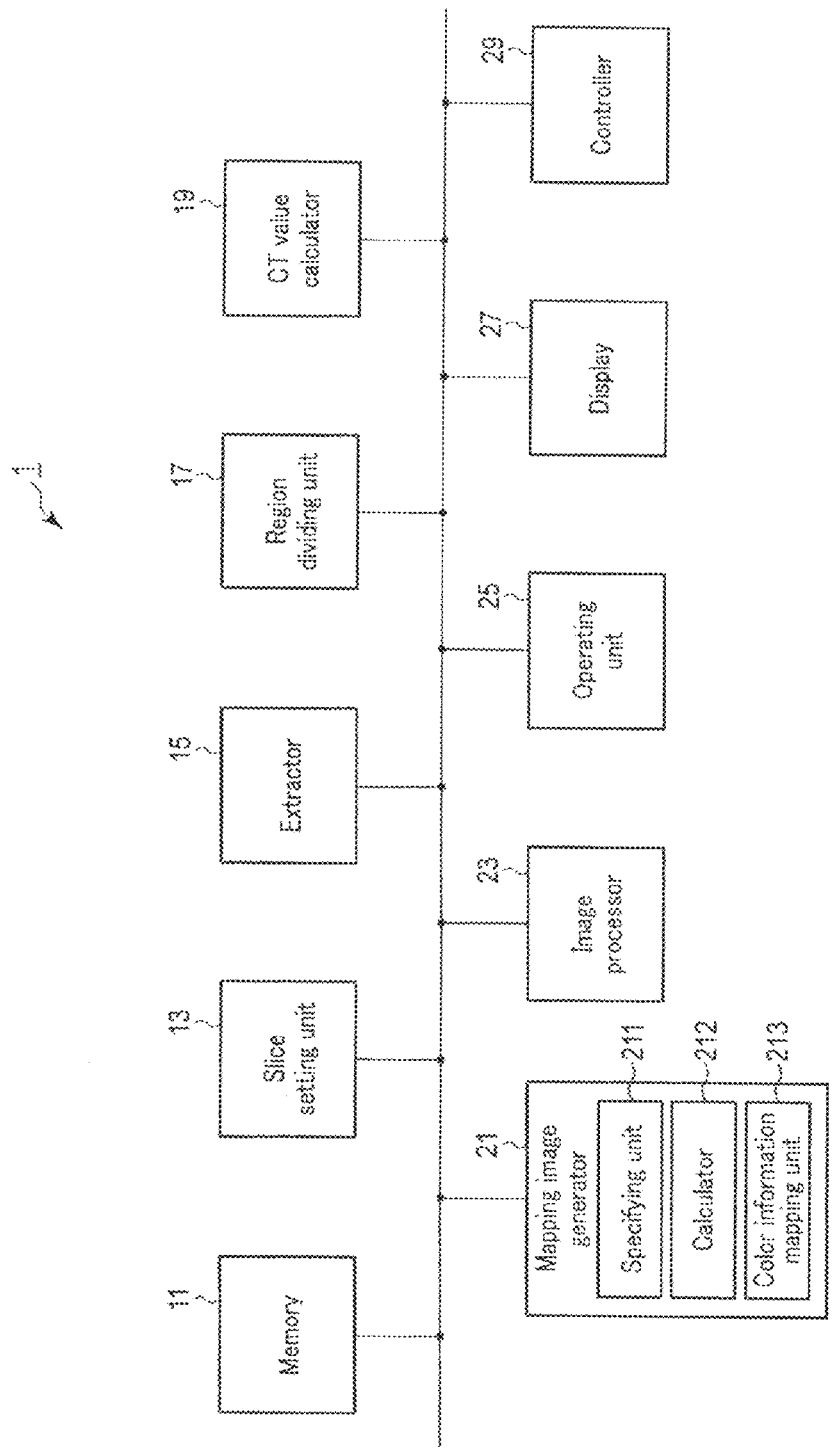
F I G. 1

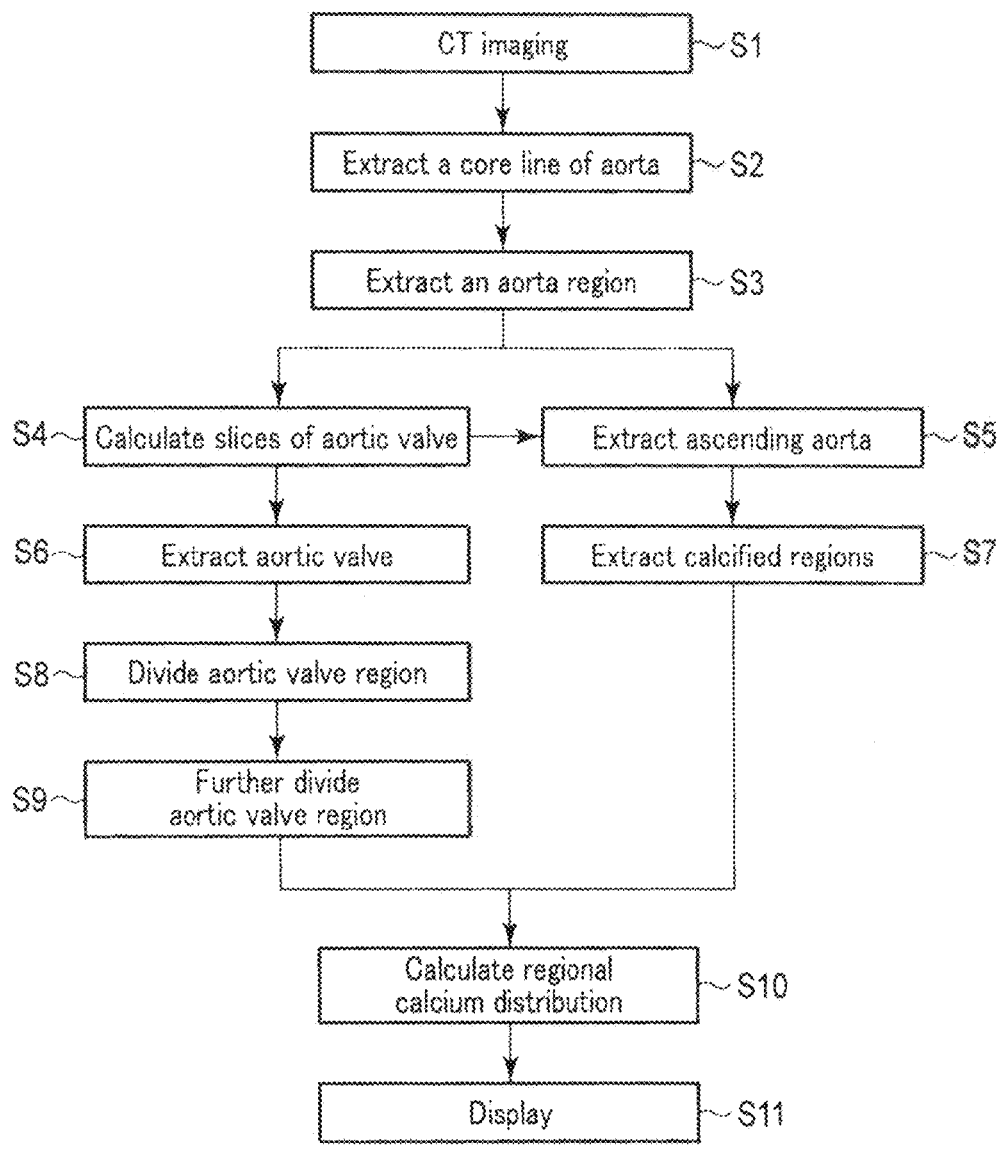
F I G. 7

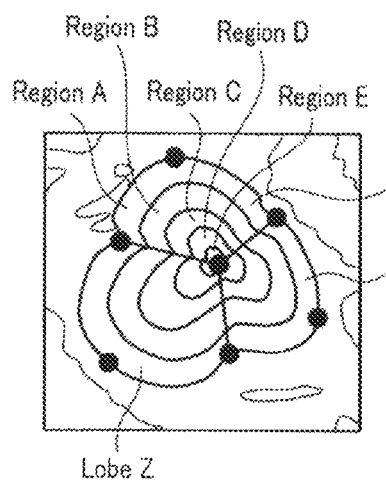
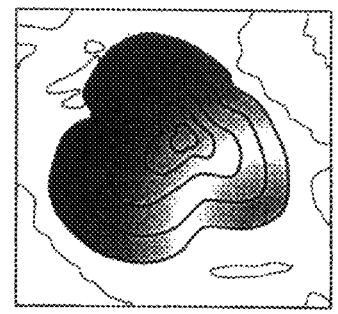
F I G. 12A        F I G. 12B
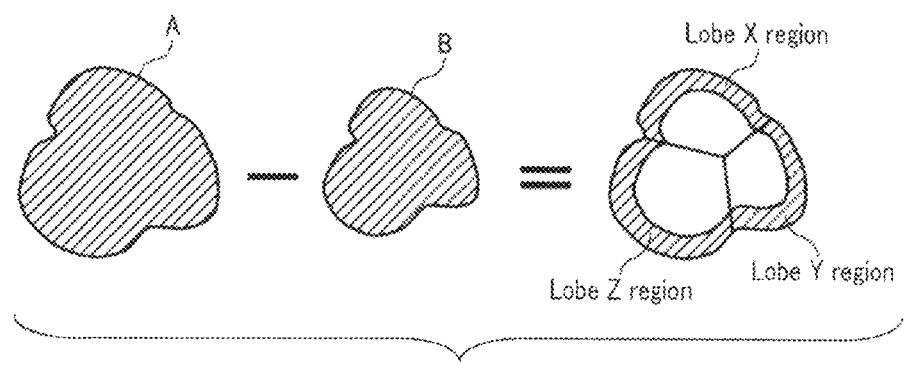
F I G. 13

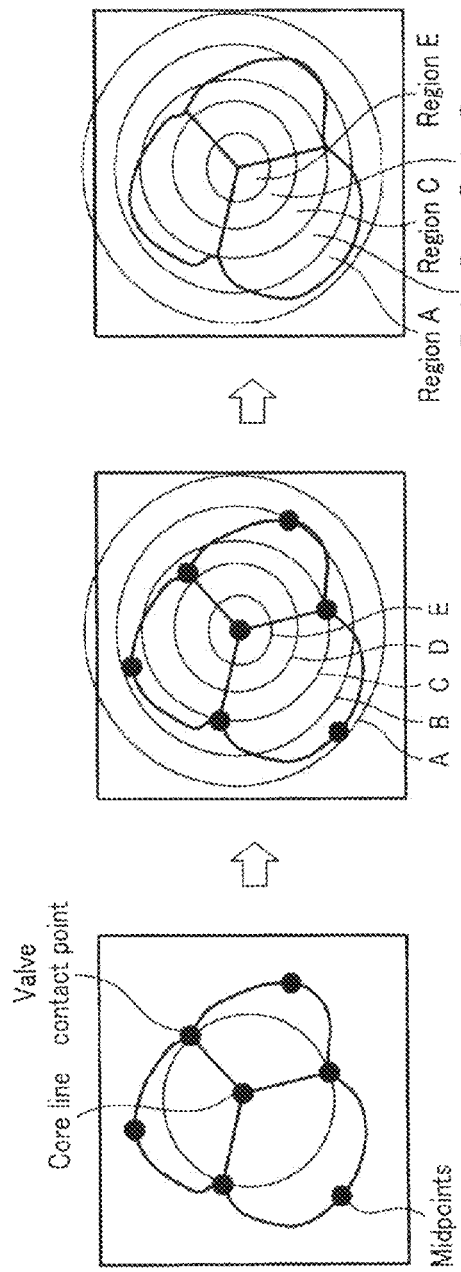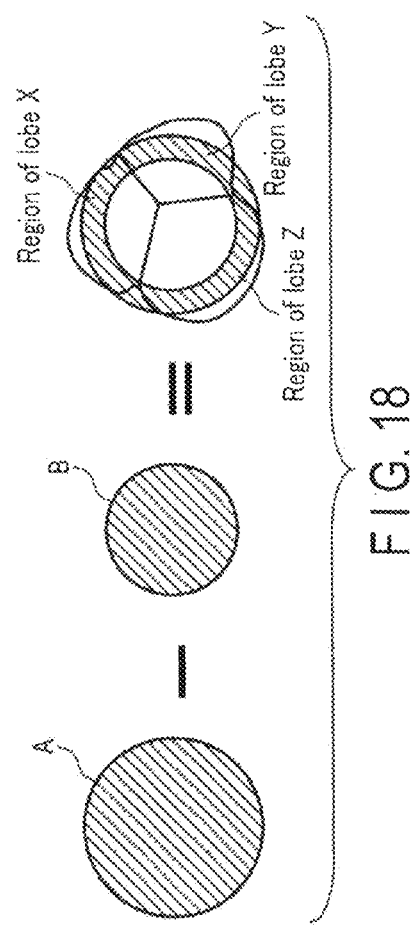

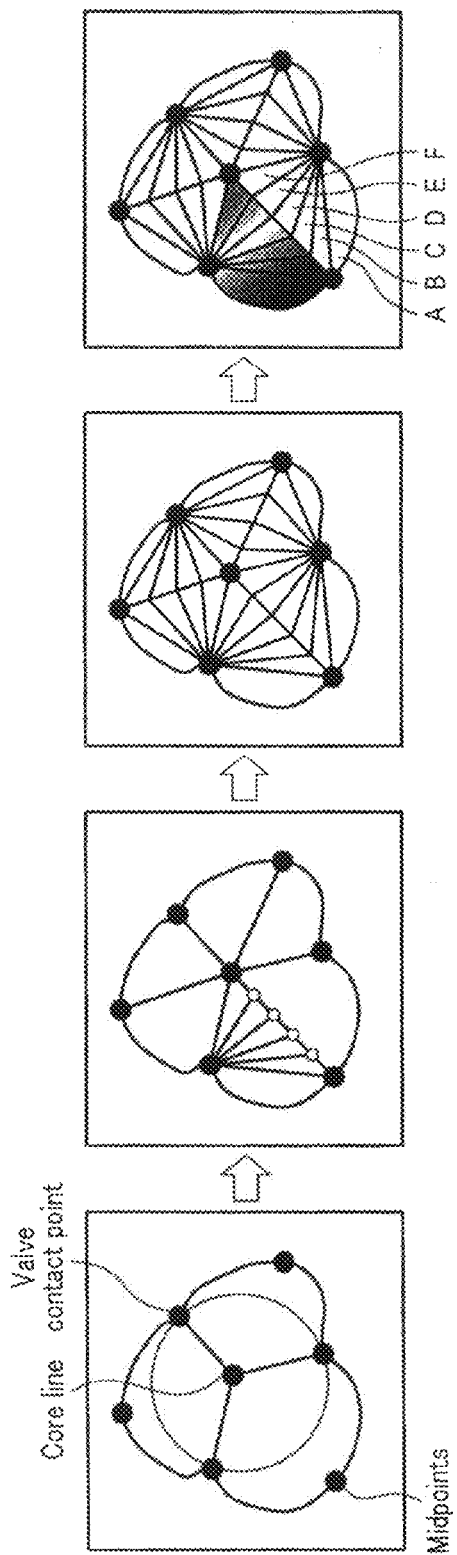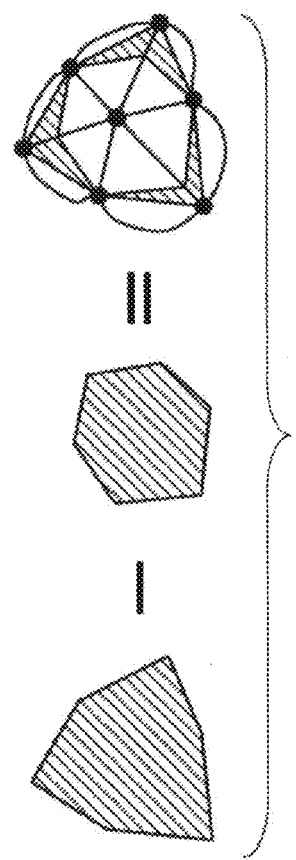

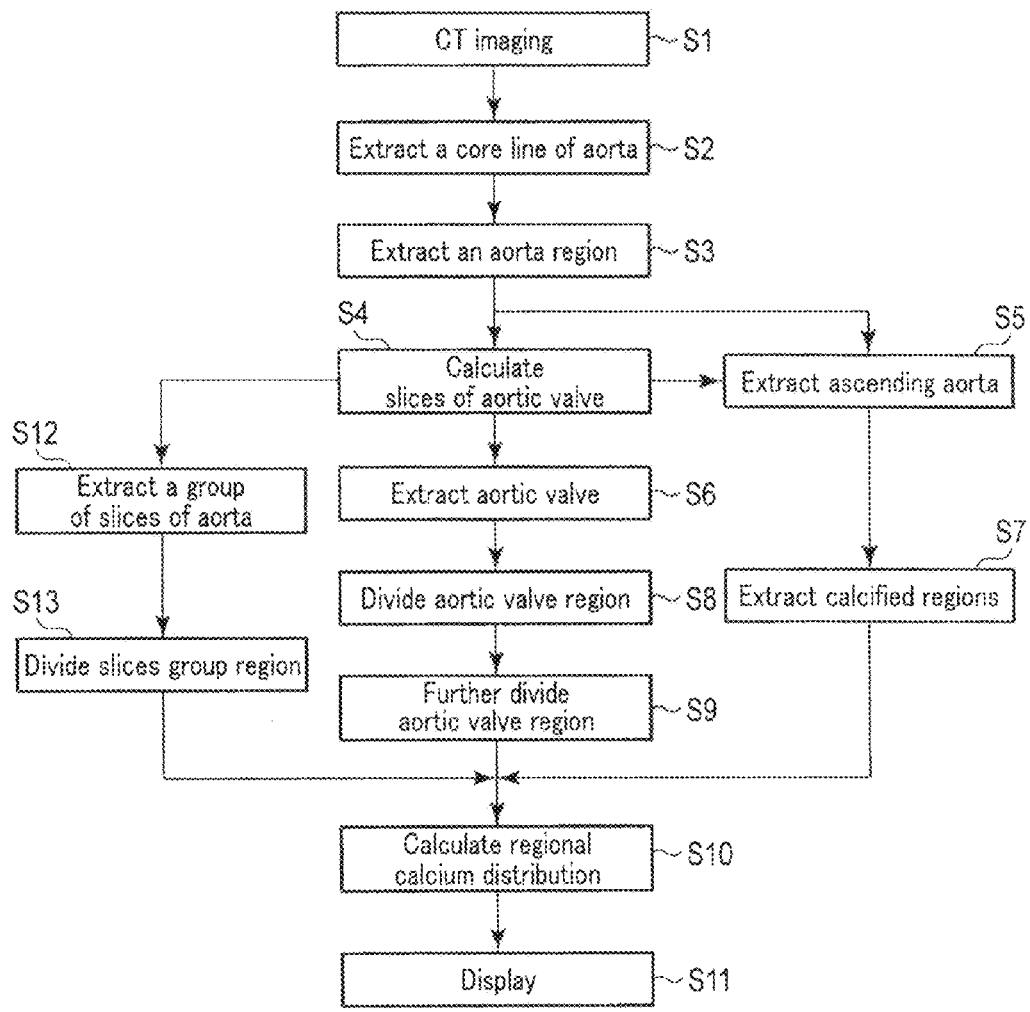
F I G. 21

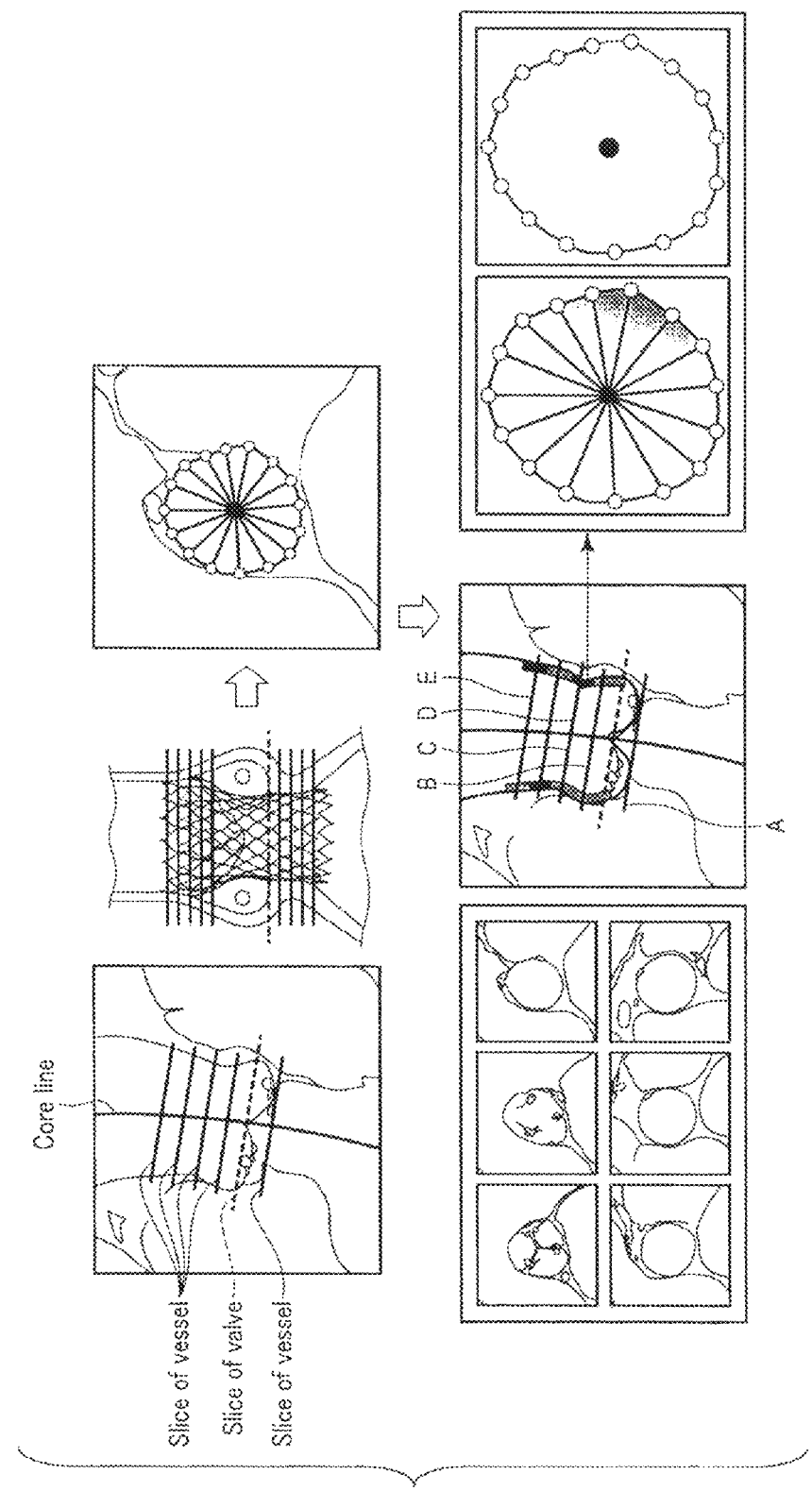
F I G. 26

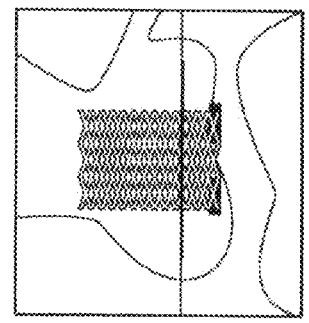
F I G. 27D
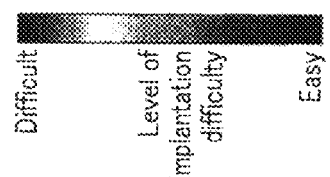
F I G. 27C
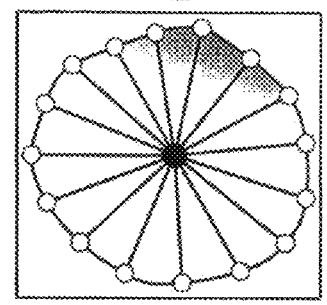
F I G. 27B
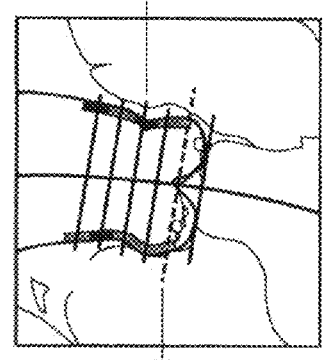
F I G. 27A

MEDICAL IMAGE PROCESSING APPARATUS AND MEDICAL IMAGE PROCESSING METHOD

CROSS-REFERENCE TO RELATED APPLICATIONS

This application is based upon and claims the benefit of priority from the Japanese Patent Application No. 2014-114057, filed Jun. 2, 2014, the entire contents of which are incorporated herein by reference.

FIELD

Embodiments described herein relate generally to a medical image processing apparatus and a medical image processing method.

BACKGROUND

An aorta valve usually consists of three cusps and is located at the exit of a left ventricle that sends blood to the entire body. The back flow of blood is prevented by opening and closing the valve. However, the valve may harden due to various causes, including congenital problems, aging, arterial sclerosis, rheumatism, and so on, making it difficult for a hardened valve to move freely. When the valves cannot move freely, the area where blood can pass becomes narrower, adversely affecting the blood flow from the left ventricle to the aorta. This symptom is called aortic stenosis.

Severe aortic stenosis causes calcification and adhesion. Major treatments for aortic stenosis are medication and surgical operations. The main surgical operations are aortic valve replacement with a mechanical or bioprosthetic valve. For a patient who cannot take a risk of open heart surgery because of their age or other reasons, transcatheter aortic valve replacement (TAVR) with an artificial valve may be performed.

It is expected that transcatheter aortic valve replacement (TAVR) will be used as a treatment for aortic stenosis. Transcatheter aortic valve replacement (TAVR) is a surgical procedure including a process of inserting a catheter from the femoral artery to the apex of the left ventricle and placing an artificial valve near the aorta valve via the catheter. When planning the treatment, a diameter of a vessel, an area of an aorta valve, and a status of calcification are checked using a computed tomography (CT) image, and a length and a path of a catheter, and a size of an artificial valve are determined based on the check result. For example, there is a known technique of searching for a luminance of a heart valve at each of a contract cycle and an expansion cycle in the direction of a vessel core to calculate an opening and closing region of the heart valve, and expressing the level of opening and closing of the heart valve in different colors.

To attach an artificial valve near the aortic valve securely, it is desirable if there is a certain amount of calcium around the root of the aortic valve and no calcium at the tip of the aortic valve. However, no conventional techniques have provided a means of checking such conditions. With a conventional technique, a length and a thickness of a catheter, a width of a path for the catheter, and a size of an artificial valve were determined only based on a diameter of a femoral artery or an aorta that is a path of the catheter, a calcification status, or an area of an aortic valve. Moreover, it was impossible to evaluate the degree of ease or difficulty of implanting an artificial valve based on objective observance of calcium distribution near an aortic valve.

Various forms of an artificial valve greatly affect the degree of ease or difficulty of implanting an artificial valve. Thus, the level of ease or difficulty of attaching an artificial valve is dependent on the degree of sedimentation of calcification of a part where the artificial valve touches a blood vessel. If the amount of calcium is greater or less than an expected amount, it is necessary to reconsider the placement position, the size, and the form of the valve. Not only the conditions of an aortic valve, but also the evaluation of calcification in the vessel wall are important elements. A technique of evaluating these elements integrally and objectively is not known.

BRIEF DESCRIPTION OF THE DRAWINGS

FIG. 1 is a function block diagram showing an example of a medical image processing apparatus according to the embodiments;

FIG. 7 is a flowchart showing an example of a procedure at the medical image processing apparatus according to the first embodiment;

FIG. 12A is a drawing to explain a calculation of calcium distribution in a region in detail;

FIG. 12B is a drawing to explain the calculation of calcium distribution in a region in detail;

FIG. 13 is a drawing to explain the calculation of calcium distribution in a region in, detail;

FIG. 17A is a drawing to explain the process of dividing a living valve image into multiple regions in the second embodiment;

FIG. 17B is a drawing to explain the process of dividing a living valve image into multiple regions in the second embodiment;

FIG. 17C is a drawing to explain the process of dividing a living valve image into multiple regions in the second embodiment;

FIG. 18 is a drawing to explain another example of the calculation of calcium distribution in a region in detail;

FIG. 19A is a drawing to explain the process of dividing a living valve image into multiple regions in the third embodiment;

FIG. 19B is a drawing to explain the process of dividing a living valve image into multiple regions in the third embodiment;

FIG. 19C is a drawing to explain the process of dividing a living valve image into multiple regions in the third embodiment;

FIG. 19D is a drawing to explain the process of dividing a living valve image into multiple regions in the third embodiment;

FIG. 20 is a drawing to explain another example of the calculation of calcium distribution in a region in detail;

FIG. 21 is a flowchart showing an example of a procedure at the medical image processing apparatus according to the fourth embodiment;

FIG. 26 is a drawing showing an example of a mapping image of distribution of an amount of calcium and an implantation difficulty level for a section of a vessel;

FIG. 27A is a drawing showing a mapping image of a slice perpendicular to a vessel core line, indicating an implantation difficulty level for an artificial valve;

FIG. 27B is a drawing showing a mapping image of a slice parallel to a vessel core line, indicating an implantation difficulty level for an artificial valve;

FIG. 27C is a drawing showing a mapping image of a vessel core line, indicating an implantation difficulty level for an artificial valve; and FIG. 27D is a drawing showing an example of a CT image indicating the status where an artificial valve is implanted.

DETAILED DESCRIPTION

In general, according to one embodiment, a medical image processing apparatus includes a valve extractor, a specifier and a calculator. The valve extractor extracts a living valve image by analyzing 3D image data related to an anatomical part of a subject. The specifier specifies distribution of an amount of calcium in the living valve image from CT values of pixels in the living valve image. The calculator calculates distribution of difficulty levels of implanting an artificial valve to the anatomical part in the living valve image based on a comparison between the amount of calcium and a predetermined set value.

Hereinafter, embodiments will be described with reference to the drawings. In the following, a technique of evaluating a level of ease or difficulty of implanting an artificial heart valve to a diseased part with a catheter technique will be disclosed. In the explanation hereinafter, the level of ease or difficulty of implantation, which is a target of evaluation in the embodiments disclosed herein, will be referred to as an implantation difficulty level. The implantation difficulty level is synonymous with a level of implantation, or a setting difficulty level.

In the embodiments, a heart is taken as an example of an anatomical part in the body of a subject. In the explanation herein, a vessel to be processed is an aorta of the heart, and a living valve to be processed is an aortic valve.

FIG. 1 is a function block diagram showing an example of a medical image processing apparatus according to the embodiments. Heart valves are a target for image diagnosis using the medical image processing apparatus 1 according to the embodiment. As is well known, the heart has the aortic valve, the mitral valve, the pulmonary valve, and the tricuspid valve. The embodiments disclosed herein are applicable not only to these valves of the heart, but also any valves in other body parts. In the following, the embodiments specialized in the aortic valve will be explained.

Figure 2:
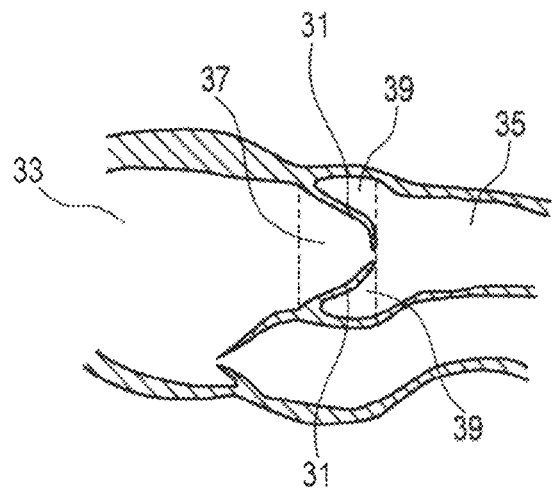
FIG. 2 is a schematic drawing of the anatomical structure of a cardiac valve (aortic valve) which is an image diagnosis target in the embodiments.

As shown in FIG. 2, the aortic valve lies between a left ventricle 33 and an aorta 35, and it prevents the blood that flowed out of the left ventricle 33 from flowing backward. The aortic valve consists of three cusps 31. The space surrounded by the three cusps 31 is called a valve opening 37. The area size of the valve opening 37 on a slice including a cross-section of all three cusps 31 is called a valve opening area.

The area within the valve opening outline on a slice is the valve opening area. The space between each of the cusps 31 and the inner wall of the aorta 35 is called an aortic sinus 39 (so-called sinus of valsalva). FIG. 2 shows two of the three cusps.

Figure 3:
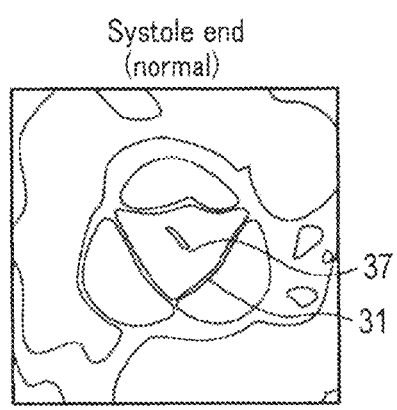
FIG. 3 is a drawing of the aortic valve shown in FIG. 2 when it opens completely.
Figure 4:
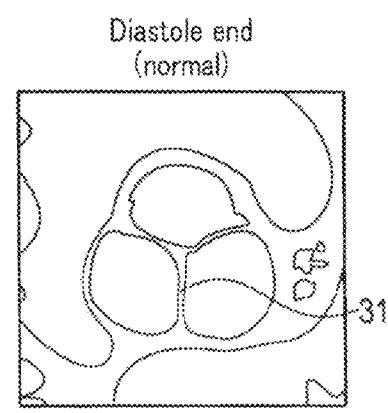
FIG. 4 is a drawing of the aortic valve shown in FIG. 2 when it is completely closed.

As shown in FIG. 3, during the phase when the left ventricle contracts (e.g., end systole), a normal aortic valve completely opens. As shown in FIG. 4, during the phase when the left ventricle relaxes (e.g., end diastole), a normal aortic valve completely closes.

An aortic valve diagnosed with a valvular heart disease does not open or close completely. For example, an aortic valve diagnosed with aortic valve stenosis does not completely open even during end systole. For example, an aortic valve diagnosed with aortic insufficiency does not completely close even during end diastole.

Figure 5:
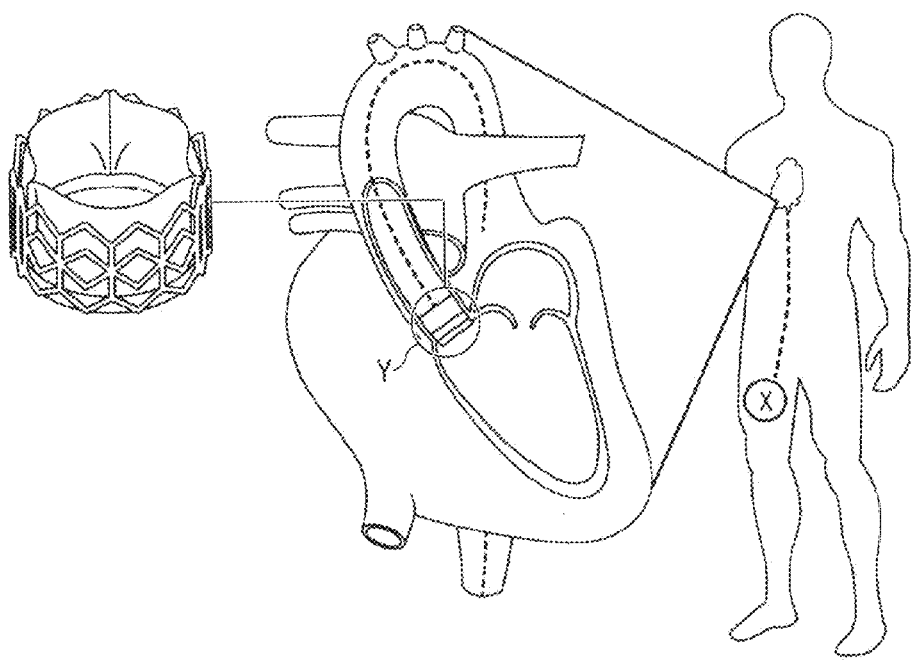
FIG. 5 is a schematic view to briefly explain the valve replacement operation.

To address such problems, a valve replacement procedure is performed as shown in FIG. 5. Valve replacement is a procedure in which an artificial valve is delivered to the heart and replaces a diseased aortic valve by implanting the artificial valve to the artery wall (indicated as Y in FIG. 5). The artificial valve is attached to the tip of a catheter inserted inside the patient's body from, for example, an artery of the groin (indicated as X in FIG. 5). and the artificial valve is delivered to the diseased aortic valve.

As shown in FIG. 1, the medical image processing apparatus 1 comprises a memory 11, a slice setting unit 13, an extractor 15, a region divider 17, a CT value calculator 19, a mapping image generator 21, an image processor 23, an operating unit 25, a display 27, and a controller 29.

The memory 11 stores three-dimensional (3D) image data (volume data) of the cardiac region of a subject. Three-dimensional image data is collected by imaging modalities, such as an X-ray computed tomography apparatus, a magnetic resonance imaging apparatus, an X-ray diagnosis apparatus, and an ultrasonic diagnostic apparatus. In the present embodiments, 3D image data is collected using an X-ray computed tomography apparatus.

The X-ray computed tomography apparatus, for example, performs dynamic scanning on a heart enhanced by a contrast medium, and collects multiple 3D image data of a plurality of cardiac cycles for at least one heartbeat. The memory 11 stores the 3D image data associated with each cardiac cycle.

The slice setting unit 13 sets a slice of a cross-section of a vessel region in the aorta in a 3D image in accordance with instructions from a user via the operating unit 25 or based on an imaging process. This vessel slice is set in the proximity of the valve opening or sinus of the aorta.

The extractor 15 extracts an aorta core line and an aortic valve image by analyzing the volume data using a known image processing. The extractor 15 also extracts, using a known image processing, a plurality of slices of the aorta taken in the core line from the extracted aorta core line and aortic valve image.

The region dividing unit 17 divides the aortic valve image extracted by the extractor 15 into multiple regions. The region dividing unit 17 divides the aortic valve wall image shown in each of the extracted slices of the aorta into multiple regions with respect to the aortic valve core line.

The CT value calculator 19 calculates an average CT value from the volume data for each of the divided regions.

The mapping image generator 21 generates a mapping image. The mapping image generator 21 comprises a specifying unit 211, a calculator 212, and a color information mapping unit 213.

The specifying unit 211 specifies a calcified region included in the aortic valve image, based on the average CT value calculated by the CT value calculator 19 for each region. In other words, the specifying unit 211 calculates distribution of an amount of calcium in the aortic valve image from a CT value for each pixel of the aortic valve image.

The calculator 212 calculates a difficulty level of artificial valve implantation for the specified calcified region. In other words, the calculator 212 calculates a distribution of difficulty levels of artificial valve implantation to the heart in the living valve image based on a calculated amount of calcium and a predetermined set value.

Figure 6:
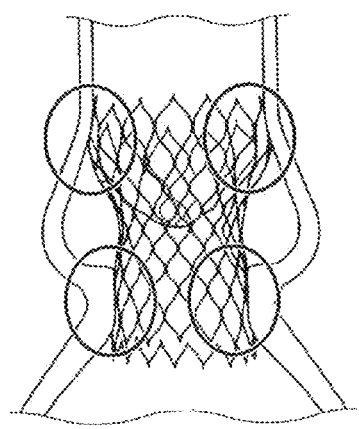
FIG. 6 is a schematic view to explain a difficulty level in implanting an artificial valve.

As shown in FIG. 6, an amount of calcium deposited in the areas where the artificial valve and a vessel are in contact (the parts circled in FIG. 6) is crucial when evaluating difficulty of implanting an artificial valve. The calculator 212 evaluates a difficulty level of artificial valve implantation to at least these areas objectively based on the CT values. For example, the calculator 212 calculates the difficulty level based on a difference between an actual amount of deposited calcium calculated based on the CT values, and a predetermined permissible range or permissible value of an amount of calcium.

The explanation continues, returning to FIG. 1. The color information mapping unit 213 performs mapping of color information corresponding to the calculated difficulty level onto each pixel in the aortic valve image in order to generate a mapping image. In other words, the mapping image generator 21 maps a color corresponding to the difficulty level onto each pixel in the aortic valve image extracted by the extractor 15. This is how a mapping image is generated.

The image processor performs a 3D image processing on the 3D image data; and generates data of 2D CT images. As a 3D image processing, a multi planar reconstruction (MPR) technique and a volume rendering technique, for example, are adopted. For example, the image processor 23 generates MPR image data of the evaluated section based on the 3D image data.

The operating unit 25 accepts various instructions and information inputs from a user. A pointing device, such as a mouse and a track ball, a selector device, such as a mode switch, etc., and an input device, such as a keyboard, etc., may be used as the operating unit 25, as needed.

The display 27 displays an MPR image and a volume-rendered image, etc. on which a mapping image is superimposed on a display device. As a display device, a CRT display, a liquid crystal display, an organic EL display, or a plasma display, etc. can be used, as needed.

When the controller 29 receives from the operating unit 25 a request to start a process of evaluating an implantation difficulty level, the controller 29 controls each functional block in the medical image processing apparatus 1, and executes the process of evaluating an implantation difficulty level.

A general-purpose computer can be adopted as basic hardware for the medical image processing apparatus 1. The medical image processing apparatus 1 can realize quantitative evaluation of an aortic valve by executing an image processing program by a central processor unit (CPU) installed on a computer.

The image processing program is installed onto the computer in advance. Or, the image processing program may be distributed to the computer in the form of a removable storage medium, such as a magnetic disc, an optical-magnetic disc, an optical disc, a semiconductor memory, etc. on which the image processing program is stored, or may be distributed to the computer via a network. The distributed image processing program can be realized by being installed onto the computer, as needed.

Some or all of the above-mentioned functional blocks may be realized by hardware, such as a logic circuit. Also, the above functional blocks may be realized by a combination of hardware and software control. Next, a plurality of embodiments will be described based on the above configuration.

First Embodiment

FIG. 7 is a flowchart showing an example of a procedure at the medical image processing apparatus according to the first embodiment. In FIG. 7, the medical image processing apparatus 1 obtains CT image data (volume data), and stores the CT image data in the memory 11 (step S1). Next, the extractor 15 extracts an aorta core line from the CT image data (step S2), and extracts an aorta region (step S3).

Figure 8:
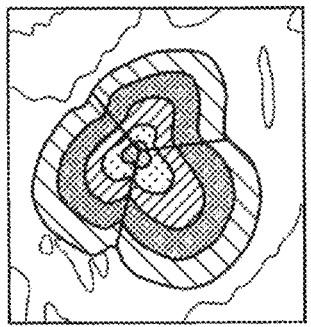
FIG. 8 is an example of an extracted ascending aorta region.

Next, the slice setting unit 13 calculates slices of an aortic valve from the CT image data (step S4), and sends the calculation result to the extractor 15. The extractor 15 extracts a region of the ascending aorta as shown in, for example, FIG. 8 (step S5). The specifying unit 211 extracts a calcified region based on the CT values calculated by the CT value calculator 19 (step S7).

Figure 9:
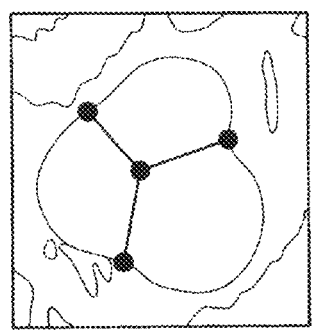
FIG. 9 is a drawing illustrating how an extracted aortic valve region is divided into three regions at a calculation process.
Figure 10:
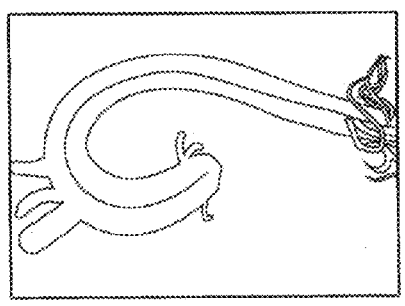
FIG. 10 is a drawing illustrating that how the divided aortic valve regions are divided into smaller regions at a calculation process.

The extractor 15 extracts the aortic valve from the CT image data (step S6). The region dividing unit 17 divides the extracted aortic valve region into three regions (lobe regions) with a known technique, as shown in FIG. 9 (step S8). The region dividing unit 17 divides the lobe regions into smaller regions as shown in FIG. 10 (step S9).

When the procedure so far is completed, the mapping image generator 21 executes a regional calcium distribution calculation process (step S10). At this step, an amount of calcium for each region is determined. The difficulty level of artificial valve implantation is evaluated based on the calcium distribution. A mapping image in which each color of a pixel corresponds to the difficulty level of implantation is generated. The display 27 displays an image obtained by superimposing the mapping image on a living valve image.

FIGS. 11A to 11D are the drawings to explain the process of dividing a living valve image into multiple regions in the first embodiment (i.e., the process at step S9).

Figure 11D:
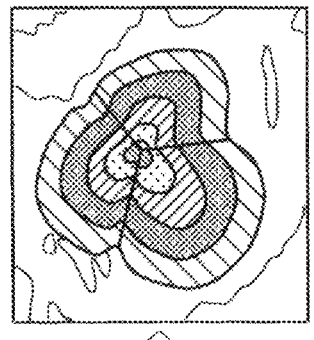
FIG. 11D is a drawing to explain the process of dividing an image of a tissue valve image into regions.
Figure 11C:
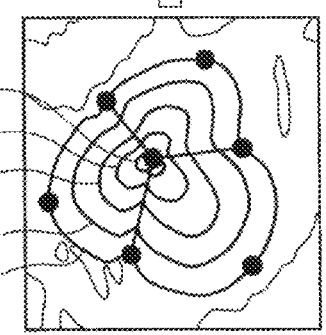
FIG. 11C is a drawing to explain the process of dividing an image of a tissue valve image into regions.
Figures 11A, 11B:
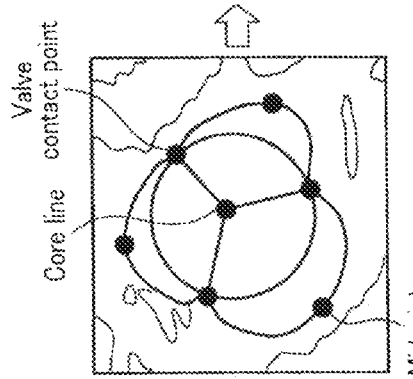
FIG. 11A is a drawing to explain the process of dividing an image of a tissue valve image into regions.
FIG. 11B is a drawing to explain the process of dividing an image of a tissue valve image into regions.

(1) The region dividing unit 17 determines a core line of the aorta as shown in FIG. 11A based on vessel core lines (core lines) and an aortic valve extracted in advance. Next, the region dividing unit 17 draws a circle around the core line to determine three points where the circle meets the outline of the vessel wall (valve wall). Hereinafter, the three points will be called "valve contact points" for explanatory purposes. The valve contact points can be regarded as points contacting with the lobe regions.

(2) Next, the region dividing unit 17 determines three midpoints of the three valve contact points on the outline of the vessel wall. By this process, three midpoints on a circle can be determined, as shown in FIG. 11A.

(3) Next, the region dividing unit 17 places several controlling points (indicated as small white circles in FIG. 11B) on the vessel outline between the valve contact points and the midpoints, and these control points are moved in a direction perpendicular to the outline for a few millimeters or a few pixels. The moving direction is not only limited to a direction perpendicular to the outline, but also to a direction toward the core line.

(4) Next, the region dividing unit 17 connects the moved points to make a line. Thus, an inward line of the vessel outline is newly defined as shown in FIG. 11B.

(5) By repeating the processes of (1) through (4), the living valve image is divided into contour-line shaped small regions. Each line is distinguished by the letters A, B, C, D, and E.

(6) Finally, the region dividing unit 17 divides each lobe region into multiple regions in accordance with a distance from the vessel wall, using lines A, B, C, D, and E obtained at the process (5), the core line, and location information of the valve contact points. Thus, the divided regions are defined as shown in FIGS. 10 and 11D.

The regional calcium distribution calculation at step S10 will be explained in detail with reference to FIGS. 12A, 12B, and 13. As shown in FIG. 12A, the divided regions obtained by dividing the aortic valve region into smaller regions are labeled for differentiation as region A, region B, region C, region D, and region E from the closest to the vessel wall. The three regions constituting the aortic valve are labeled as lobe X, lobe Y, and lobe Z.

(7) The specifying unit 211 calculates an amount of calcium (e.g., the number of pixels) in each of the divided regions of each of the lobes, using a region dividing result and a calcified region extraction result. As shown in FIG. 13, an amount of calcium in region A can be calculated by subtracting the number of pixels in a region surrounded by line B from the number of pixels in a region surrounded by line A.

Figure 14:
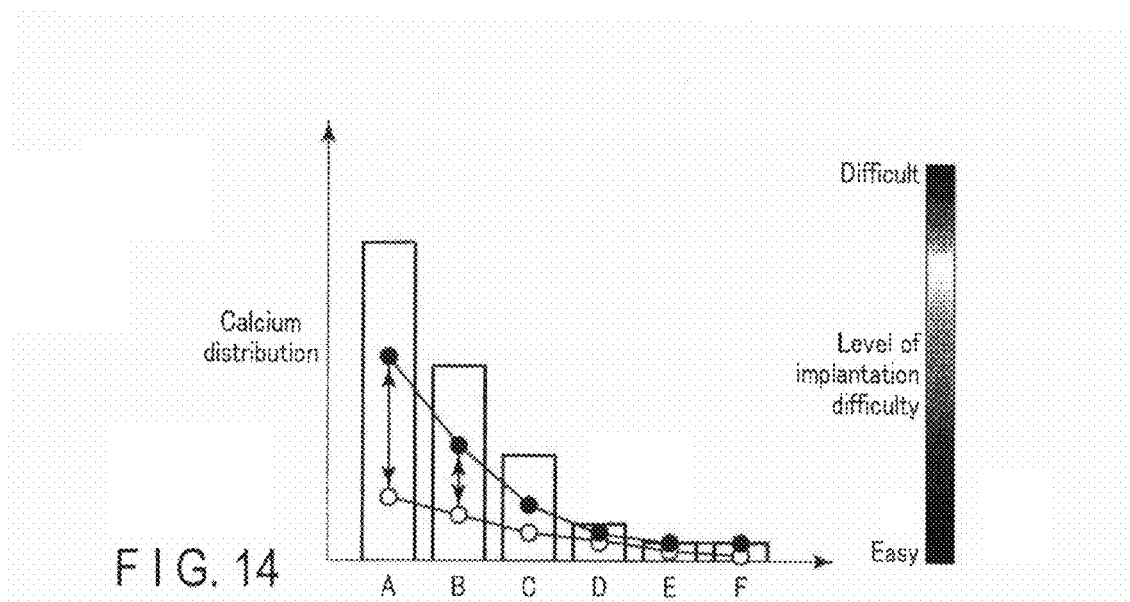
FIG. 14 is a drawing illustrating an upper limit and a lower limit of an amount of calcium which is set for each of the divided regions.

(8) If the distribution of amounts of calcium in regions A, B, C, D, and E in each of lobes X, Y and Z is determined, the calculator 211 compares each of the amounts with a predetermined set value. The set value may be a value set by a user, or a default value stored in the apparatus. As shown in FIG. 14, for example, an upper/lower limit for an amount of calcium in each of regions A, B, C, D, and E is determined in advance.

Figure 15:
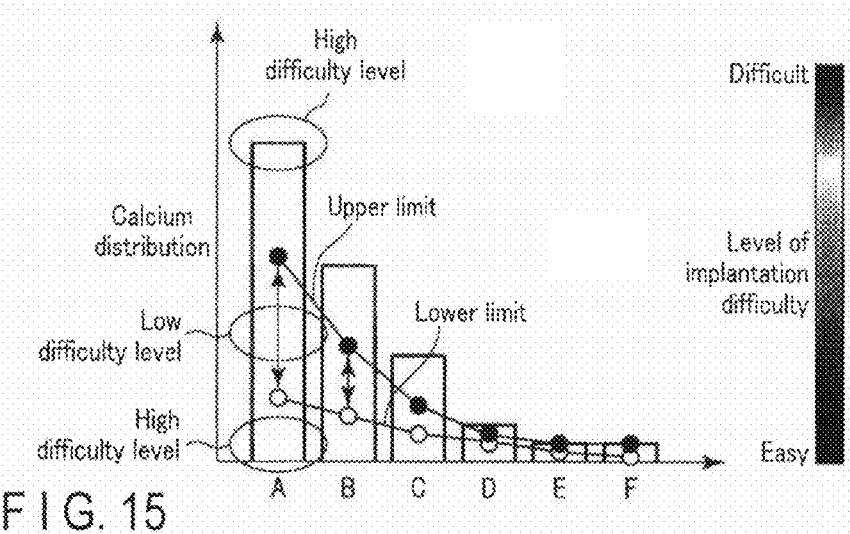
FIG. 15 is a drawing illustrating the relationship between the upper limit and the lower limit of an amount of calcium and a implantation difficulty level.

(9) As shown in FIG. 15, if the amount of calcium falls within the range between the upper limit and the lower limit, the implantation difficulty level is low. The more the amount of calcium exceeds the upper limit or the lower limit, the higher the implantation difficulty level will be. The calculator 212 performs such comparison for all regions, or each pixel to determine the implantation difficulty level for each pixel.

Figure 16:
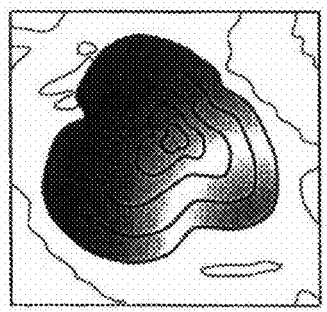
FIG. 16 is a drawing of an example of an aortic valve image on which a mapping image indicating an implantation difficulty level is superimposed.

(10) The color information mapping unit 213 maps a color corresponding to the calculated implantation difficulty level for each pixel to generate a mapping image, as shown in FIG. 12B. This mapping image is superimposed onto the aortic valve image (living valve image) extracted by the extractor 15. Thus, a medical image as shown in FIG. 16 is newly generated.

Referring to the mapping image as shown in FIG. 12B, the difficulty level at the root area of lobe Y (the area near the vessel wall, i.e., region A) is high. This means that the amount of calcium of said region is greater or less than expected.

As described above, in the first embodiment, an aorta core line and an aorta region are extracted from CT image data (volume data) of a cardiac region of a subject. An aortic valve is extracted from the CT image data, and the extracted image is divided into multiple smaller regions including the tip and root of the aortic valve. Furthermore, an ascending aorta is extracted from the CT image data, and a calcified region in the range including a vessel wall is extracted based on CT values (or pixel values). By comparing an amount of calcium in each of the aortic valve region and the area near the aorta with a set value, an implantation difficulty level for an artificial value is quantitatively evaluated. The implantation difficulty level can be determined from a permissible amount of calcium, which is calculated from the distribution of calcification in the root/tip of the aortic valve, and a threshold. Furthermore, a mapping image in which colors corresponding to implantation difficulty levels are mapped on an aortic valve image is generated, and the mapping image is superimposed on a living valve image.

Thus, it becomes possible to objectively evaluate the degree of ease or difficulty of implanting an artificial valve. Accordingly, a medical expert can properly determine a position for placing an artificial valve and extent of implantation when planning a treatment. As a result, it becomes possible to evaluate a difficulty level of artificial valve implantation, and to provide a medical image processing apparatus and method that support discussing medical treatment plans.

Second Embodiment

FIG. 17A to 17C are drawings to explain the process of dividing a living valve image into multiple regions in the second embodiment.

(11) As shown in FIG. 17A, similarly to FIG. 11A, the region dividing unit 17 draws a circle around the core line, and determines three points (valve contact points) where the circle meets the vessel wall (valve wall) outline.

(12) Next, the region dividing unit 17 draws multiple concentric circles around the core line, as shown in FIG. 17B. Hereinafter, the circles will be distinguished as A, B, C, D, and E. The region dividing unit 17 divides each of the lobes into multiple regions, using each of the circles, the vessel outline, the core line, and the valve contact points, based on the distance from the core line as shown in FIG. 17C.

(13) The specifying unit 211 calculates an amount of calcium (e.g., the number of pixels) in each of the divided regions of each of the lobes, using a region dividing result and a calcified region extraction result.

As shown in FIG. 18, the amount of calcium in region A can be calculated by subtracting the number of pixels in the region surrounded by circle B from the number of pixels in the region surround by circle A. Thus, it is possible to divide regions by a method different from the method adopted in the first embodiment. Accordingly, the second embodiment can produce the same effect as the first embodiment.

Third Embodiment

FIGS. 19A to 19D are drawings to explain the process of dividing a living valve image into multiple regions in the third embodiment.

(14) As shown in FIG. 19A, similarly to FIG. 11A, the region dividing unit 17 draws a circle around the core line to determine three valve contact points.

(15) Next, the region dividing unit 17 draws six lines from the core line to the valve contact points and midpoints, as shown in FIG. 19B.

(16) Next, the region dividing unit 17 places the control points on the line connecting the core line and the midpoints at a regular interval, and connects the valve contact points and the control points as shown in FIG. 19C. Thus, the living valve image is divided into multiple regions.

(17) The specifying unit 211 calculates an amount of calcium (e.g., the number of pixels) in each of the divided regions (e.g., regions A, B, C, D, E, and F in FIG. 19D) of each of the lobes, using a region dividing result and a calcified region extraction result. Based on the calculation result, a mapping image is generated indicating an implantation difficulty level for an artificial valve, as shown in FIG. 19D.

As shown in FIG. 20, the amount of calcium in each of the divided regions can be calculated by subtracting the number of pixels in a larger region from the number of pixels in the next largest region. Thus, it is possible to divide regions by a method different from the methods adopted in the first and second embodiments. Accordingly, the third embodiment can produce the same effects as the first and second embodiments.

Fourth Embodiment

FIG. 21 is a flowchart showing an example of a procedure at the medical image processing apparatus according to the fourth embodiment. In the first through third embodiments, the aortic valve is divided into multiple regions, using a distance from the core line of the aortic valve to the vessel wall as an index. Then, an average of CT values of the pixels included in a divided region is calculated. In the fourth embodiment, the vessel wall is further divided into smaller regions.

In FIG. 21, the steps same as those in FIG. 7 are labeled with the same step numbers, and only the different steps are explained herein. Accordingly, the processes at step S12 and S13 will be explained.

Figure 22:
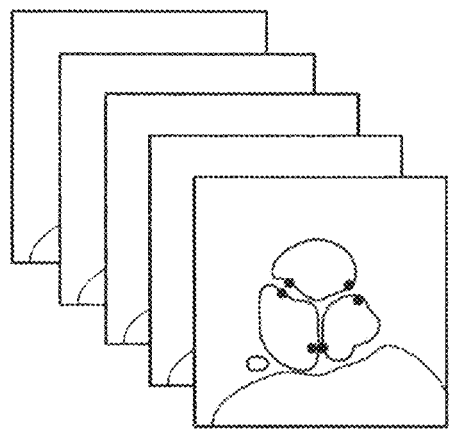
FIG. 22 is a drawing to explain the process of extracting a plurality of slices of the aorta in the fourth embodiment.
Figure 23:
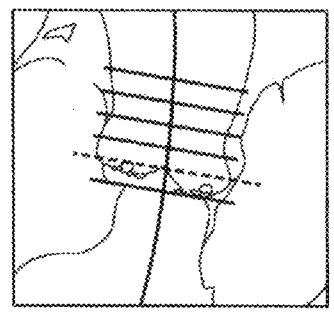
FIG. 23 is a slice of a valve to explain the process of extracting a plurality of slices of the aorta in the fourth embodiment.

(18) In step S12, the extractor 15 performs the process of extracting a group of slices of the aorta. In other words, the extractor 15 extracts a plurality of slices perpendicular to the core line in the core line direction, from the aortic core line and the aortic valve extracted by the process up to step S4, using the aortic valve slice position as a reference. Thus, a plurality of slices of the aorta can be extracted as shown in FIGS. 22 and 23. The plurality of slices may be extracted at even intervals from the valve slice. Or, the slice position may be adjusted non-uniformly, in accordance with the shape of the artificial valve to be placed.

Figure 24:
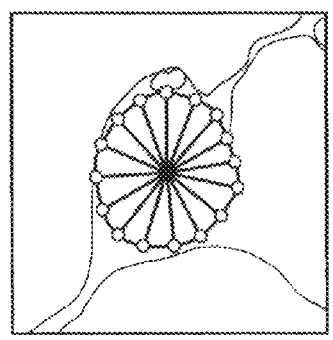
FIG. 24 is a schematic diagram to explain the process of radially dividing the aortic wall into regions in the fourth embodiment.

(19) In the following step S13, as shown in FIG. 24, the extractor 15 radially divides the aorta wall into multiple regions at an equal angle, with respect to the core line. Or, the extractor 15 may radially divide the aorta wall into multiple regions with respect to the core line, in a manner such that the dividing length is equal. This dividing process is performed for each of the aorta slices.

Figure 25:
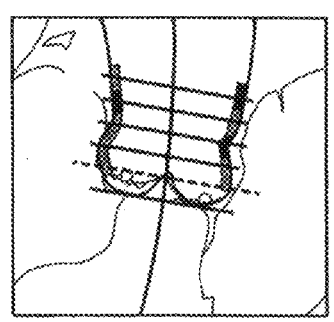
FIG. 25 is a schematic diagram taken from the view point parallel to the vessel core line, showing an mapping image of a plurality of slices of the proximity of the aortic valve.

(20) The specifying unit 211 calculates an average CT value of the vessel wall divided at step S12, and calculates an amount of calcium (e.g., the number of pixels) in each region, as shown in FIG. 25, for example.

As shown in the bottom right of FIG. 26, the implantation difficulty level based on the amount of calcium can be evaluated for each of the radially-sectioned regions of the slice. It is possible to generate a mapping image, like the ones shown in FIGS. 27A through 27C, using this implantation difficulty level as an index.

FIG. 27A is a drawing showing a mapping image of a slice perpendicular to a vessel core line, indicating an implantation difficulty level for an artificial valve. FIG. 27A shows an image similar to the one in FIG. 12B. FIG. 27B is a drawing showing a mapping image of a slice parallel to a vessel core line, indicating an implantation difficulty level for an artificial valve. FIG. 27C is a drawing showing a mapping image of a vessel core line, indicating an implantation difficulty level for an artificial valve. FIG. 27D is a drawing showing an example of a CT image indicating the status where an artificial valve is implanted.

As described above, in the fourth embodiment, a plurality of vessel slice images taken along the vessel core line are extracted from CT image data (volume data) of a cardiac region of a subject. Each of the extracted slices is radially divided with respect to the core line. The distribution of calcium is calculated for each of the divided regions, and the difficulty level of artificial valve implantation is evaluated based on the calcium distribution.

Thus, when planning a treatment, it is possible to ascertain a calcified region in the aortic valve and in the vessel wall in the proximity of the aortic valve. If the evaluation of the implantation difficulty level for an aortic valve in the first to third embodiments is combined with the evaluation of the implantation difficulty level for an aortic valve in the fourth embodiment, it is possible to minutely discuss a position of an artificial valve, a degree of implantation, a shape, and size of an artificial valve in more detail.

In the above embodiments, the divided regions used for calculating an amount of calcium are separately defined as the valve regions and the vessel regions. In the valve regions, the valve slice is divided in the diameter direction. In the vessel regions, the vessel slice is divided radially with respect to the core line. The calcium distribution indicating an amount of calcium in each divided region is generated for each valve.

A mapping image indicating implantation difficulty levels with colors is generated. Blue, for example, is mapped uniformly to a region where an implantation difficulty level falls within the permissible range based on the calcium distribution. Red or yellow, for example, is mapped to a region where an implantation difficulty level falls outside of the permissible range. The hue is changed in accordance with a distance from the upper limit or the lower limit of the permissible range. The permissible range of implantation difficulty level may be set different for the valve region and the vessel region respectively. Furthermore, setting of the permissible range may reflect the fact that too much or too little calcium will make it difficult to implant an artificial valve.

Thus, according to each of the present embodiments, it becomes possible to objectively evaluate the degree of ease or difficulty of implanting an artificial valve. As a result, it becomes possible to provide a medical image processing apparatus and method that would provide information useful when discussing medical treatment plans.

The embodiments described above are not restrictive. In the above explanation herein, a target vessel is an aorta of the heart, and a target living valve is an aortic valve. The technique according to the present embodiments may be applied to veins and venous valves.

The functions explained in the above embodiment can be implemented by one or a plurality of processing units. The processing units can be, for example, a dedicated or general-purpose processor, circuit (circuitry), processing circuit (circuitry), operation circuit (circuitry), arithmetic circuit (circuitry), or Application Specific Integrated Circuit (ASIC), Simple Programmable Logic Device (SPLD), Complex Programmable Logic Device (CPLD), and Field Programmable Gate Array (FPGA).

Each processing unit may be implemented as a processor including an electronic circuit such as a memory. The processing unit can include a processor that functions by a program stored in a memory. The processing unit can include an application specific integrated circuit (IC) or a conventional circuit element to execute the above-described functions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A medical image processing apparatus comprising:
    processing circuitry configured to:
        extract a living valve image by analyzing 3D image data related to an anatomical part of a subject;
        specify a distribution of an amount of calcium in the living valve image from CT values of pixels in the living valve image;
        calculate a distribution of difficulty levels of implanting an artificial valve to the anatomical part in the living valve image based on a comparison between the amount of calcium and a predetermined set value;
        extract a vessel slice related to the living valve by analyzing the 3D image data;
        calculate a distribution of calcium in the vessel wall of the vessel slice from CT values of pixels in the vessel slice; and
        calculate a distribution of implantation difficulty levels for an artificial valve in the vessel wall.

2. The medical image processing apparatus of claim 1, wherein the processing circuitry is further configured to:
    divide the living valve image and the vessel wall into a plurality of regions, and
    calculate the amount of calcium for each of the plurality of regions.

3. The medical image processing apparatus of claim 2, wherein the processing circuitry is further configured to
    divide the living valve image into contour-line shaped regions from a region near the vessel wall to the vessel core line.

4. The medical image processing apparatus of claim 3, wherein the processing circuitry is further configured to
    divide the region-divided living valve image into a plurality of lobes constituting the living valve.

5. The medical image processing apparatus of claim 2, wherein the processing circuitry is further configured to
    divide the living valve image radially with respect to a vessel core line.

6. The medical image processing apparatus of claim 5, wherein the processing circuitry is further configured to
    divide the region-divided living valve image into a plurality of lobes constituting the living valve.

7. The medical image processing apparatus of claim 1, wherein the processing circuitry is further configured to
    extract a plurality of vessel slices in the direction of a vessel core line from the vessel slice and the living valve image, and
    radially divide the vessel wall in each of the vessel slices with respect to the vessel core line.

8. The medical image processing apparatus of claim 1, wherein the anatomical part is a heart, the vessel is an aorta, and the living valve is an aortic valve.

9. The medical image processing apparatus of claim 1, wherein the processing circuitry is further configured to:
    generate a mapping image in which a color corresponding to the implantation difficulty level is mapped to each of the pixels of the living valve image, and
    the apparatus further comprises a display which displays an image obtained by superimposing the mapping image on the living valve image.

10. A medical image processing method comprising:
    extracting a living valve image by analyzing 3D image data related to an anatomical part of a subject;
    specifying a distribution of an amount of calcium in the living valve image from a CT value of each pixel in the living valve image;
    calculating a distribution of difficulty levels of implanting an artificial valve to the anatomical part in the living valve image based on a comparison between the amount of calcium and a predetermined set value; and
    extracting a vessel slice related to the living valve by analyzing the 3D image data, wherein
    the step of specifying the distribution of the amount of calcium in the living valve image includes calculating a distribution of calcium in the vessel wall of the vessel slice from CT values of pixels in the vessel slice,
    the step of calculating the distribution of difficulty levels of implanting the artificial valve includes calculating a distribution of implantation difficulty levels for an artificial valve in the vessel wall.

11. The medical image processing method of claim 10, further comprising
    dividing the living valve image and the vessel wall into a plurality of regions, wherein
    the step of specifying the distribution of the amount of calcium in the living valve image includes calculating the amount of calcium for each of the plurality of regions.

12. The medical image processing method of claim 11, wherein the step of dividing the living valve image and the vessel wall into the plurality of regions includes dividing the living valve image into contour-line shaped regions from a region near the vessel wall to the vessel core line.

13. The medical image processing method of claim 12, wherein the step of dividing the living valve image and the vessel wall into the plurality of regions includes further dividing the region-divided living valve image into a plurality of lobes constituting the living valve.

14. The medical image processing method of claim 11, the step of dividing the living valve image and the vessel wall into the plurality of regions includes radially dividing the living valve image with respect to the vessel core line.

15. The medical image processing method of claim 14, wherein the step of dividing the living valve image and the vessel wall into the plurality of regions includes further dividing the region-divided living valve image into a plurality of lobes constituting the living valve.

16. The medical image processing method of claim 10, wherein
the step of extracting the vessel slice includes extracting a plurality of vessel slices in the direction of a vessel core line from the vessel slice and the living valve image, and
the step of dividing radially the living valve image with respect to the vessel core line includes dividing the vessel wall of each of the vessel slices with respect to the vessel core line.

17. The medical image processing method of claim 10, wherein the anatomical part is a heart, the vessel is an aorta, and the living valve is an aortic valve.

18. The medical image processing method of claim 10, further comprising:
generating a mapping image in which a color corresponding to the implantation difficulty level is mapped to each of the pixels of the living valve image; and
superimposing the mapping image onto the living valve image.

* * * * *